United States Patent
Guha et al.

(10) Patent No.: US 9,718,945 B2
(45) Date of Patent: Aug. 1, 2017

(54) THERMOSET POLYOL COMPOSITIONS AND METHODS OF USE THEREOF

(71) Applicant: CONTINENTAL STRUCTURAL PLASTICS, INC., Troy, MI (US)

(72) Inventors: Probir Kumar Guha, Troy, MI (US); Michael J. Siwajek, Rochester Hills, MI (US); Michael J. Hiltunen, Rochester, MI (US); Ashley B. Hartmann, Shelby Township, MI (US); Shane Michael Skop, Troy, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 10 days.

(21) Appl. No.: 14/764,130

(22) PCT Filed: Jan. 29, 2014

(86) PCT No.: PCT/US2014/013527
§ 371 (c)(1),
(2) Date: Jul. 28, 2015

(87) PCT Pub. No.: WO2014/120725
PCT Pub. Date: Aug. 7, 2014

(65) Prior Publication Data
US 2016/0009905 A1    Jan. 14, 2016

Related U.S. Application Data

(60) Provisional application No. 61/758,145, filed on Jan. 29, 2013.

(51) Int. Cl.
| | |
|---|---|
| C08K 7/02 | (2006.01) |
| C08K 7/06 | (2006.01) |
| C08K 7/14 | (2006.01) |
| C08L 23/12 | (2006.01) |
| C08L 97/02 | (2006.01) |
| C08K 7/10 | (2006.01) |
| C08L 79/04 | (2006.01) |
| C08K 3/26 | (2006.01) |
| C08K 3/22 | (2006.01) |
| C08K 3/34 | (2006.01) |
| C08L 67/00 | (2006.01) |
| C08L 23/06 | (2006.01) |
| C08J 5/24 | (2006.01) |
| C08J 5/04 | (2006.01) |

(52) U.S. Cl.
CPC ........ *C08K 7/02* (2013.01); *C08J 5/04* (2013.01); *C08J 5/24* (2013.01); *C08K 3/22* (2013.01); *C08K 3/26* (2013.01); *C08K 3/346* (2013.01); *C08K 7/06* (2013.01); *C08K 7/10* (2013.01); *C08K 7/14* (2013.01); *C08L 23/06* (2013.01); *C08L 23/12* (2013.01); *C08L 67/00* (2013.01); *C08L 79/04* (2013.01); *C08L 97/02* (2013.01); *C08J 2371/02* (2013.01); *C08K 2003/222* (2013.01); *C08K 2003/2227* (2013.01); *C08K 2003/265* (2013.01); *C08L 2205/16* (2013.01)

(58) Field of Classification Search
CPC . C08J 5/04; C08J 5/24; C08J 2371/02; C08K 3/22; C08K 3/26; C08K 3/346; C08K 7/02; C08K 7/06; C08K 7/10; C08K 7/14; C08K 2003/222; C08K 2003/2227; C08K 2003/265; C08L 23/06; C08L 23/12; C08L 67/00; C08L 79/04; C08L 97/02
USPC ......................................................... 524/494
See application file for complete search history.

(56) References Cited

U.S. PATENT DOCUMENTS

| | | | |
|---|---|---|---|
| 4,222,929 A | 9/1980 | Shanoski et al. | |
| 4,673,696 A | 6/1987 | Tsai | |
| 2004/0202691 A1* | 10/2004 | Richard | A61K 9/0024 424/423 |
| 2011/0256961 A1 | 10/2011 | Rajagopalan et al. | |

FOREIGN PATENT DOCUMENTS

| | | |
|---|---|---|
| EP | 2048172 A1 | 4/2009 |
| WO | 8906252 A1 | 7/1989 |
| WO | 9307216 A1 | 4/1993 |
| WO | 2005118665 A1 | 12/2005 |

OTHER PUBLICATIONS

Supplementary European Search Report dated Nov. 25, 2016 for International Application No. EP 14 74 6134, filed.

(Continued)

*Primary Examiner* — Ling Choi
*Assistant Examiner* — Chun-Cheng Wang
(74) *Attorney, Agent, or Firm* — Avery N. Goldstein; Blue Filament Law PLLC

(57) ABSTRACT

A molding composition formulation is provided of a thermoset cross-linkable polyol having unsaturated backbone comprising the structure defined by formula 1: (1) a reinforcing filler; and optionally, a flame retardant, a UV stabilizer or a composition comprising one of the foregoing.

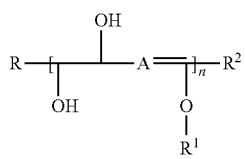

16 Claims, No Drawings

(56) References Cited

OTHER PUBLICATIONS

Sekkar, V., Gopalakrishnan, S., Devi, K. Ambika, "Studies on allophanate-urethane networks based on hydroxyl terminated polybutadiene: effect of isocyanate type on the network characteristics", to purchase http://dx.doi.org/10.1016/S0014-3057(02)00364-6;Copyright © 2003 Elsevier Science Ltd., All rights reserved; http://www.sciencedirect.com/science/article/pii/S0014305702003646; pp. 1-2, Jan. 31, 2017.

* cited by examiner

THERMOSET POLYOL COMPOSITIONS AND METHODS OF USE THEREOF

RELATED APPLICATIONS

This application claims priority benefit of U.S. Provisional Application Ser. No. 61/758,145 filed Jan. 29, 2013; the contents of which are hereby incorporated by reference.

FIELD OF THE INVENTION

The present disclosure relates to thermoset polyol compositions, specifically to cross-linkable thermoset polyol compositions having an unsaturated backbone.

BACKGROUND

Reinforced thermoset plastics are made of plastic resins and reinforcing fibers. They are widely used in commerce as materials because of their advantageous combination of properties, including light weight, high strength to weight ratio, and ease and versatility of construction.

A major technical challenge underlying thermoplastic resin compositions is that although thermoplastic resin compositions are relatively easy to process, the high temperature stability, durability, resistance to creep, (high temperature) dynamic behavior of these polyurethanes, as well as their stability in some commonly-used processing aids, is less than might be desired for some applications.

Furthermore, flow properties during processing (e.g., MVR), poses continuing challenge considering the ever increasing complex molding shapes, two-component molding operations and the like used in, for example, injection molding and blow molding.

In view of the above, there is a continuing need for thermoplastic resin compositions that meets the above challenges.

SUMMARY OF THE INVENTION

Disclosed, in various embodiments, are thermoset polyol compositions, and, in other embodiments, cross-linkable thermoset polyol compositions having an unsaturated backbone.

In an embodiment provided herein is a molding composition formulation comprising: a thermoset cross-linkable polyol resin having unsaturated backbone comprising the structure defined by formula 1:

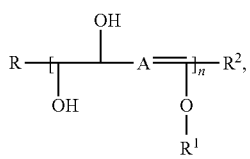
(1)

where A is a saturated or unsaturated aliphatic $C_{1-18}$ chain, a bisphenol, —COOH, —(CH2)$_m$—C(OH)—, —O—, —S—, or a composition comprising at least one of the foregoing; R and $R^2$ are independently, a saturated or unsaturated aliphatic, or cycloaliphatic polymer, an aliphatic or cycloaliphatic alcohol, or a composition comprising at least one of the foregoing; $R^1$ is H, $C_{1-18}$ chain, cyanate, or a composition comprising at least one of the foregoing; n is an integer between 1 and 500; a reinforcing filler; and optionally, a flame retardant, a UV stabilizer or a composition comprising one of the foregoing.

In another embodiment, provided herein is a molding composition formulation comprising: a thermoset cross-linkable polyol resin having unsaturated backbone; reinforcing filler; optionally, a flame retardant, a UV stabilizer, or a composition comprising one of the foregoing and a non-fibrous filler.

These and other features of the thermoset, cross-linkable polyol resin having unsaturated backbone will become apparent from the following detailed description when read in conjunction with the following examples, which are exemplary, and not limiting.

DETAILED DESCRIPTION OF THE PREFERRED EMBODIMENTS

Provided herein are embodiments of are thermoset polyol compositions. The unsaturated polyol resin contains an unsaturated monomer in the backbone as well as a polyester polymer. The polymer is an unsaturated polyol made from a hydroxyl component and a carboxylic component. The hydroxyl component contains both a monomeric diol or triol, and a polymeric polyol. The polymeric polyol comprises a hydroxyl-functionalized polymer such as a polyether or polyester diol or triol. The carboxylic component can be provided by an unsaturated carboxylic diacid, an unsaturated carboxylic anhydride, an unsaturated carboxylic diester or mixtures thereof In an embodiment, the polymer is a linear polymer, branched polymer, a graft polymer, so long as the polymer backbone, referring to the linear chain of the polymer to which all other chains may be regarded as being pendant, has at least one unsaturated bond capable of undergoing cross linking by reacting with π-electrons.

In an embodiment, provided herein is a molding composition formulation comprising: a thermoset cross-linkable polyol resin having unsaturated backbone comprising the structure defined by formula 1:

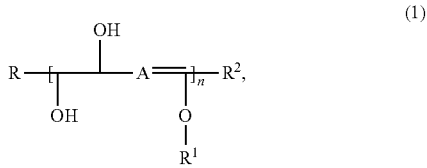
(1)

wherein
A is a saturated or unsaturated aliphatic $C_{1-18}$ chain, a bisphenol, —COOH, —(CH2)$_m$—C(OH)—, —O—, —S—, or a composition comprising at least one of the foregoing;
R and $R^2$ are independently, a saturated or unsaturated aliphatic, or cycloaliphatic polymer, an aliphatic or cycloaliphatic alcohol, or a composition comprising at least one of the foregoing;
$R^1$ is H, $C_{1-18}$ alkyl, cyanate, or a composition comprising at least one of the foregoing; and
n is an integer between 1 and 500;
a reinforcing filler; and
optionally, a flame retardant, a UV stabilizer or a composition comprising one of the foregoing.

In an embodiment, the term "aliphatic" refers to a linear or branched array of atoms that is not cyclic and has a valence of at least one. Aliphatic groups are defined in another embodiment, to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl. It should be noted that alkyl is a subset of aliphatic.

In an embodiment, the thermoset cross-linkable polyol used in the compositions described herein comprise polyether diol or poly triol with number average molecular weight ($\overline{MW_n}$) of 200 to 2000. The polyether diol can have the general structure of OH—B$^1$—Y$^1$—B$^2$—OH, wherein each of B$^1$ and B$^2$ can independently be an alkyl, or a monocyclic divalent aryl radical and Y$^1$ can be a bridging radical having one or two atoms that separate B$^1$ from B$^2$. For example, one atom separates B$^1$ from B$^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

The poly triol compounds used in the composition provided refer in an embodiment, to polyether polyol triols, denoting compounds that contain ether groups, ester groups and OH groups.

In an embodiment, provided herein is a molding composition formulation comprising: a thermoset cross-linkable polyol resin having unsaturated backbone comprising the structure defined by formula 1:

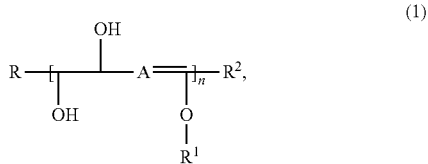

(1)

wherein
A is a saturated or unsaturated aliphatic C$_{1-18}$ chain, a bisphenol, —COOH, —(CH2)$_m$—C(OH)—, —O—, —S—, or a composition comprising at least one of the foregoing. In other embodiment, A can be, for example, 1,3-propanediol; 2-methyl-1,3-propanediol; 2-methyl-1,4-butanediol; 1,2-butanediol; 1,3-butanediol; ethylene glycol; diethylene glycol; 1,5-pentanediol; polytetramethylene glycol; propylene glycol; dipropylene glycol, or a composition comprising at least one of the foregoing.

In an embodiment, R$^1$ disposed on the backbone of the thermoset cross-linkable backbone compositions used herein can be H, saturated or unsaturated C$_{1-18}$ alkyl, or a composition comprising at least one of the foregoing. R$^1$ can also have the general formula H—[O—(CH2)$_i$]$_j$—OH, wherein i is an integer between 2 and 8 and j is an integer between about 200 and about 2000. R$^1$ can be saturated or unsaturated and can also be branched or hyperbranched (in other words, have branches of branches). For example, R$^1$ is hydrogen and the ratio of hydroxyl groups to carboxyl groups is between about 0.33 and 6.0.

The thermoset polyol compositions having an unsaturated backbone can further comprise a filler, for example, a fiber filler or a particulated filler. In an embodiment, the fiber filler can be a discontinuous fiber having a fiber length of about 3 mm to 50 mm. The discontinuous fiber filler can be, for example, glass fiber, or in other circumstances, carbon, graphite nanotubes, aramid, polypropylene, polyethyelene, basalt, poly(diimidazo pyridinylene (dihydroxy) phenylene) fiber or a fiber composition comprising at least one of the foregoing.

Non-fibrous particulated fillers can be used in the thermoset polyol compositions having an unsaturated backbone described herein. These can be, for example, calcium carbonate, or, alumnina, clay, mica, wollastonite, silicate, magnesium oxide, wood flour, and mixtures thereof, wherein the non-fibrous filler has a particle size d$_{3,2}$ of between 0.02 to 6.00 μm.

The thermoset polyol compositions having an unsaturated backbone can further comprise a cross-linking agent. The cross-linking agent can be present in an amount of preferably about 0.05 to about 5 parts, more preferably about 0.2 to about 3 parts, and most preferably about 0.2 to 2 parts, by weight of the cross-linking agents per 100 parts by weight of the unsaturated polymer. In addition, the thermoset polyol compositions having an unsaturated backbone described herein, can have a cross-link density in the range of, for example, about 10 to about 300 mol/m$^3$ (moles of effective network chains per cubic meter) or about 15 to about 250 mol/m$^3$. Also, the thermoset polyol compositions having an unsaturated backbone described herein can have good mechanical strength and toughness because of their good cross-linking network. By adjusting the cross-link density of the thermoset polyol compositions having an unsaturated backbone described herein, the scuff-resistance, toughness, and durability of the resulting golf ball cover can be improved. Cross-link density is defined as moles of effective network chains per cubic meter and computed from swelling parameters of the networks and may be measured in accordance with the procedures described in V. Sekkar, S. Gopalakrishnan, and K. Ambika Devi, Studies on Allophonate-Urethane Networks Based on Hydroxyl Terminated Polybutadiene: Effect of Isocyanate Type on the Network Characteristics, European Polymer Journal 39, (2003) (pp. 1281-1290), incorporated herein by reference in its entirety. The test specimens are placed in toluene for 48 hrs. at ambient conditions. The specimens are then removed from the solvent and weighed after removing excess solvent from the surface of the specimen. Subsequently, the solvent absorbed is driven off by placing the swollen specimen in a vacuum oven at 100° C. for 2 hrs. and the weight of the dried specimen is determined. From the weights of the swollen and dehydrated specimens, and the densities of the polymer and the solvent, the volume fraction of the polymer in the swollen specimen is calculated. The crosslink densities of the polymer networks can be obtained using Flory-Rhener equation.

The cross-linking agent used in the thermoset polyol compositions having an unsaturated backbone described herein, can be low-molecular weight poly(isocyanate), a monomeric dihydroxy-terminated compound, a low-molecular weight poly(amine), or a telechelic composition comprising at least one of the foregoing. The monomeric dihydroxy-terminated compound is propylene glycol, ethylene glycol, 1,2-butane diol, 1,4-butane diol, or a composition comprising at least one of the foregoing.

Cross-linking agents having an average functionality greater than 2.0 can be added to the compositions. For example, the cross-linking agent can be added to the mixture of the isocyanate compound, the unsaturated polyol, and chain extender. Suitable cross-linking agents can be, for example, metal salts of unsaturated carboxylic acids having from 3 to 8 carbon atoms; unsaturated vinyl compounds and polyfunctional monomers (for example, trimethylolpropane trimethacrylate (TMP and pentaerythritol)); phenylene bis-maleimide; and combinations thereof. Suitable metal salts can be, for example, one or more metal salts of acrylates, diacrylates, methacrylates, and dimethacrylates, wherein the metal is magnesium, calcium, zinc, aluminum, lithium, or nickel. For example, the cross-linking agent is zinc salts of acrylates, diacrylates (ZDA), methacrylates, and dimethacrylates. The cross-linking agent can typically be included in the base composition in an amount within the range of 1 to 70 parts per 100 part polymer.

An isocyanate operative in the compositions described herein can be, for example, hexamethylene-1-isocyanate, 2,2,4-trimethylhexamethylene-1-isocyanate; alicyclic isocyanates such as cyclohexane isocyanate, dicyclohexyl-methane-4-isocyanate, aryl isocyanates such as toluene-2-isocyanate, naphthylene-1-isocyanate; polyisocyanates such as aliphatic polyisocyanates such as hexamethylene-1,6-diisocyanate, 2,2,4-trimethylhexamethylene-1,6-diisocyanate; alicyclic polyisocyanates such as cyclohexane-1,4-diisocyanate, dicyclohexylmethane-4,4'-diisocyanate, aryl polyisocyanates such as p-phenylene diisocyanate, toluene-2,4-isocyanate, and diphenyl methane 2,4'-diisocyanate. Additionally, an isocyanate operative herein includes polyphenylene polymethylene polyisocyanate derived from condensation of aniline and formalin, liquidified diphenylmethane diisocyanates containing carbodiimide groups or uretonimine groups, modified polyisocyanates containing at least one urethane group, allophanate group, biuret group or uretodione group. For example, isocyanates can be modified polyisocyanates containing urethane groups, allophanate groups or uretodione groups such that the polyisocyanates are liquid at the ambient temperature such as 20° C.

The polymeric composition may also include various additives such as stabilizers, colorants, and the like, with the proviso that the additives do not adversely affect the desired properties of the polymeric compositions. Mixtures of additives may be used. Such additives may be mixed at a suitable time during the mixing of the components for forming the polymeric composition.

The composition may further contain one or more photoinitiators that can be activated by actinic radiation and initiate free radical cross-linking Suitable photoinitiators include, for example, aromatic ketone compounds such as benzophenones, in combination with tertiary amines, alkylbenzophenones, 4,4'-bis(dimethylamino)benzophenone (Michler's ketone), anthrone and halogenated benzophenones or mixtures of said types. Other photoinitiators, such as benzoin and its derivatives, benzyl ketals, acylphosphine oxides, for example, 2,4,6-tri-methylbenzoyldiphenylphosphine oxide, bisacylophosphine oxides, phenylglyoxylic acid esters, camphorquinone, α-aminoalkylphenones, α,α-dialkoxyacetophenones, 1-[4-phenylthio(phenyl)]octane-1,2-dione-2-(O-benzoyloxime) and α-hydroxyalkylphenones, are suitable. The photoinitiator typically is included in the base composition in an amount within the range of 0.1 to 10 weight percent.

The thermoset, cross-linkable polyol compositions having an unsaturated backbone provided herein, may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis [3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the polymeric components of the polymeric composition.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the polymeric components of the polymeric composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the polymeric components of the polymeric composition.

Suitable UV absorbing additives include for example, hydroxybenzophenones; hydroxybenzotriazoles; hydroxybenzotriazines; cyanoacrylates; oxanilides; benzoxazinones; 2-(2H-b enzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis [(2-cyano-3,3-diphenylacryloyl)oxy]2,2-bis[[(2-cyano-3,3-diphenyl-acryloyl)oxy] methyl]propane (UVINUL™ 3030); 2,2'-(1,4-phenylene) bis(4H-3,1-benzoxazin-4-one); 1,3-bis [(2-cyano-3,3-diphenylacryloyl)oxy]-2,2-bis[[(2-cyano-3,3-diphenyl-acryloyl) oxy]methyl]propane, nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the polymeric components of the polymeric composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. When present, such materials can be used in amounts of 0.001 to 1 percent by weight, specifically 0.01 to 0.75 percent by weight, more specifically 0.1 to 0.5 percent by weight of the polymeric components of the polymeric composition. A preferred mold release is penta erythritol tetra stearate (PETS).

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the polymeric components of the polymeric composition.

Shaped, formed, or molded articles comprising the thermoset polyol compositions are also provided. The thermoset polyol compositions may be molded into useful shaped articles by a variety of means such as injection molding, extrusion, rotational molding, blow molding and thermoforming to form various molded articles. Such articles may include a vehicle body panel, a vehicle interior panel, a vehicle instrument panel, a spoiler, a fairing, a vehicle interior trim part, a grill, a seat back, a piece of furniture, an office partition, surfboards, a surgical cart, a tool or equipment housing, a medical device, or a toy. The thermoset polyol compositions may be used for such applications as automotive panel and trim. Examples of suitable articles are exemplified by, but are not limited to, aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; window and door trim; sports equipment; playground equipment; shoe laces; articles made from plastic-wood combinations; golf course markers; utility pit covers; cladding or seating for public transportation; cladding or seating for trains, subways, or buses; coated helmets and personal protective equipment; coated synthetic or natural textiles; coated painted articles; coated dyed articles; coated fluorescent articles; coated foam articles; and like applications. The present disclosure further contemplates additional fabrication operations on said articles, such as, but not limited to, molding, in-mold decoration, baking in a paint oven, lamination, and/or thermoforming. The articles may be used widely in automotive industry, home appliances, electrical components, and telecommunications.

The components in the thermoset polyol compositions may be cross-linked by a variety of chemical and irradiation methods. For example, peroxides or sulfur-based agents can be used to induce cross-linking of the polymer chains. High-energy radiation, which is capable of generating free radicals, also may be used to cross-link the composition. For example, the thermoset polyol compositions can demonstrate an increase in Shore D surface hardness of at least 2.5% upon being treated with chemical and/or irradiation methods to induce cross-linking The increase in Shore D surface hardness can also be in the range of about 2.5 to 20%. In an embodiment, the thermoset polyol compositions described, can have a relatively high amount of cross-linking in their polymer chains. When these thermoset polyol compositions, along with the other components, undergo a post cross-linking process, there should be additional cross-linking The resulting article of manufacture can have increased hardness and toughness, with no substantial loss in physical properties such as cut/tear-resistance; or scuff/wear-resistance. In other words, even though the post cross-linking process generates an article having higher hardness, the article will not necessarily become brittle and there is no sacrifice of other physical properties.

Examples of suitable radiation sources include electron beams, ultra-violet (UV), gamma, X-ray, and infrared rays, heat, and combinations thereof. Organic peroxides that can be used as free-radical initiators include, for example, dicumyl peroxide; n-butyl-4,4-di(t-butylperoxy) valerate; 1,1-di(t-butylp eroxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylp eroxy)hexyne-3; di(2-t-butylperoxyisopropyl)benzene; dilauroyl peroxide; dibenzoyl peroxide; t-butyl hydroperoxide; and combinations thereof. The peroxide free-radical initiators are generally present in the polyurethane composition in an amount within the range of 0.05 to 15 parts by weight per 100 parts of the base composition.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

The invention claimed is:

1. A molding composition formulation comprising: a thermoset cross-linkable polyol resin having an unsaturated backbone comprising the structure defined by formula 1:

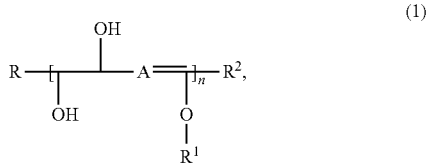

(1)

where A is a saturated or unsaturated aliphatic $C_{1-18}$ chain, —$(CH2)_m$—$C(OH)$—, or a composition comprising at least one of the foregoing;

R and $R^2$ are each independently, a saturated or unsaturated aliphatic, or cycloaliphatic polymer, an aliphatic or cycloaliphatic alcohol, cyanate, or a composition comprising at least one of the foregoing; $R^1$ is H, $C_{1-18}$ chain, or a composition comprising at least one of the foregoing; and n is an integer between 1 and 500;

a reinforcing filler; and optionally, a flame retardant, a UV stabilizer or a composition comprising one of the foregoing.

2. The composition of claim 1, wherein the thermoset cross-linkable polyol comprises polyether diol or poly triol with number average molecular weight of 200 to 2000.

3. The composition of claim 1, wherein the thermoset cross-linkable polyol comprises a polyester polyol.

4. The composition of claim 1, wherein $R^1$ is polypropylene oxide.

5. The composition of claim 1, wherein A comprises polytetramethylene glycol.

6. The composition of claim 1, wherein A comprises a polyether.

7. The composition of claim 1, further comprising: a thickener system comprising a polyether amine and an isocyanate.

8. The composition of claim 1, wherein $R^1$ is hydrogen and wherein the ratio of hydroxyl groups to carboxyl groups is between about 0.33 and 6.0.

9. The composition of claim 1, wherein the reinforcing fiber is a discontinuous fiber having a fiber length of about 3 mm to 50 mm.

10. The composition of claim 9, wherein the discontinuous fiber is carbon, glass, aramid, polypropylene, polyethylene, basalt, poly{diimidazo pyridinylene (dihydroxy) phenylene} fiber or a fiber composition comprising at least one of the foregoing.

11. The composition of claim 1, further comprising a cross-linking agent.

12. The composition of claim 11, wherein the cross-linking agent is poly(isocyanate), a monomeric dihydroxy-terminated compound, a low-molecular weight poly(amine), or a telechelic composition comprising at least one of the foregoing.

13. The composition of claim 12, wherein the monomeric dihydroxy-terminated compound is propylene glycol, ethylene glycol, 1,2-butane diol, 1,4-butane diol, or a composition comprising at least one of the foregoing.

14. The composition of claim 1, further comprising a non-fibrous filler.

15. The composition of claim 14, wherein the non-fibrous filler is calcium carbonate, alumnina, clay, mica, wollastonite, silicate, magnesium oxide, wood flour, and mixtures thereof, wherein the non-fibrous filler has a particle size $d_{3,2}$ of between 0.02 to 6.00 μm.

16. A molded article of manufacture comprising the composition of claim 1 in a cured state corresponding a shape of a mold.

* * * * *